March 28, 1961 R. N. SHOWALTER ET AL 2,976,693
METHOD OF OPERATING MARINE STRUCTURES
Filed Oct. 11, 1954 6 Sheets-Sheet 2

INVENTORS
ROBERT N. SHOWALTER
LEON B. DE LONG
GEORGE E. SUDEROW
BY Cushman, Darby & Cushman
ATTORNEYS

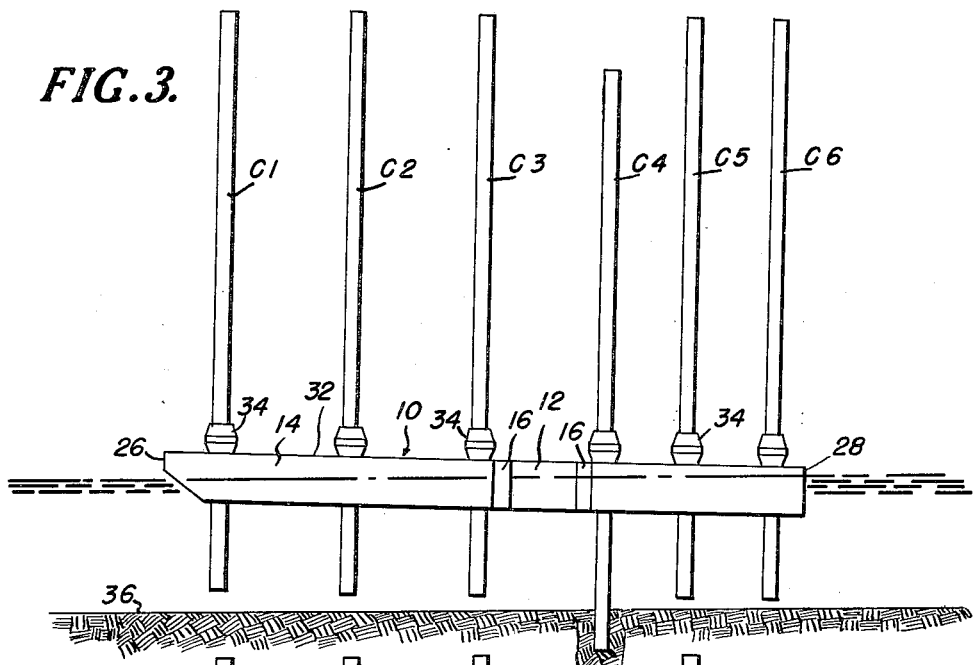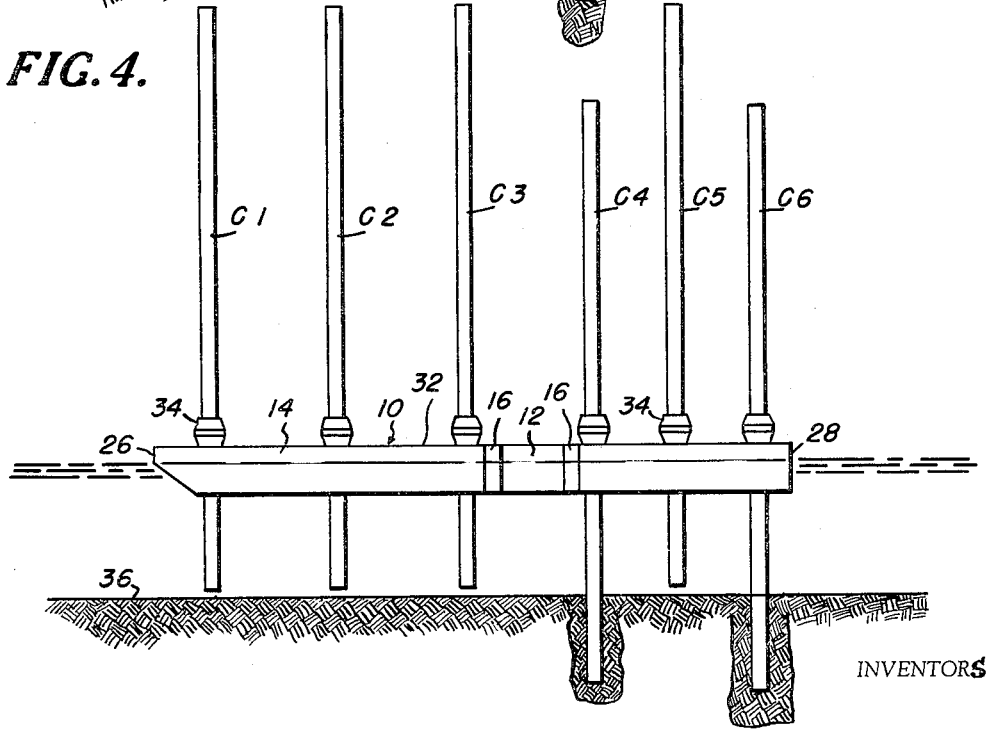

March 28, 1961   R. N. SHOWALTER ET AL   2,976,693
METHOD OF OPERATING MARINE STRUCTURES
Filed Oct. 11, 1954   6 Sheets-Sheet 4

INVENTORS
ROBERT N. SHOWALTER
LEON B. DELONG
GEORGE E. SUDEROW

BY Cushman, Darby & Cushman
ATTORNEYS

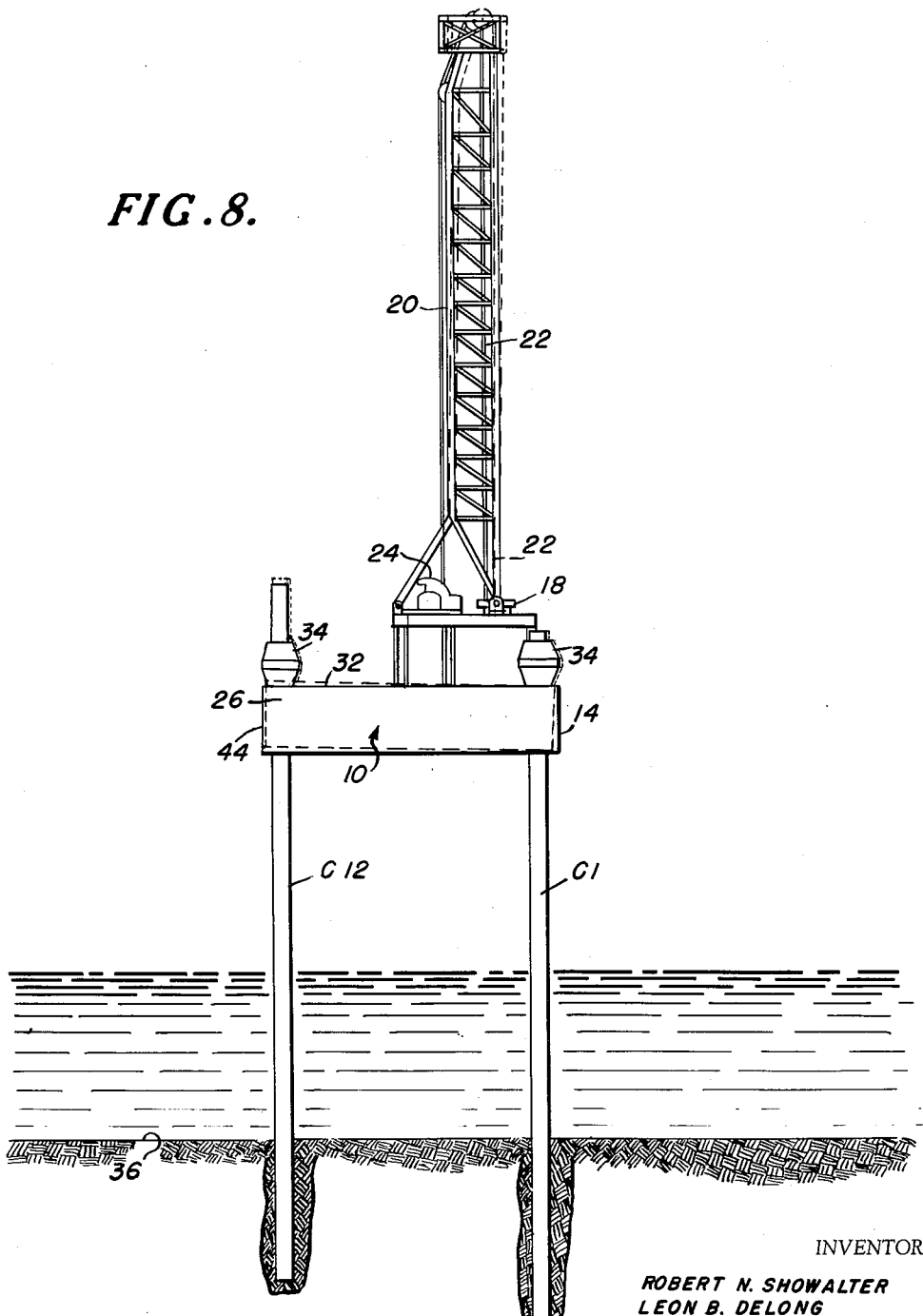

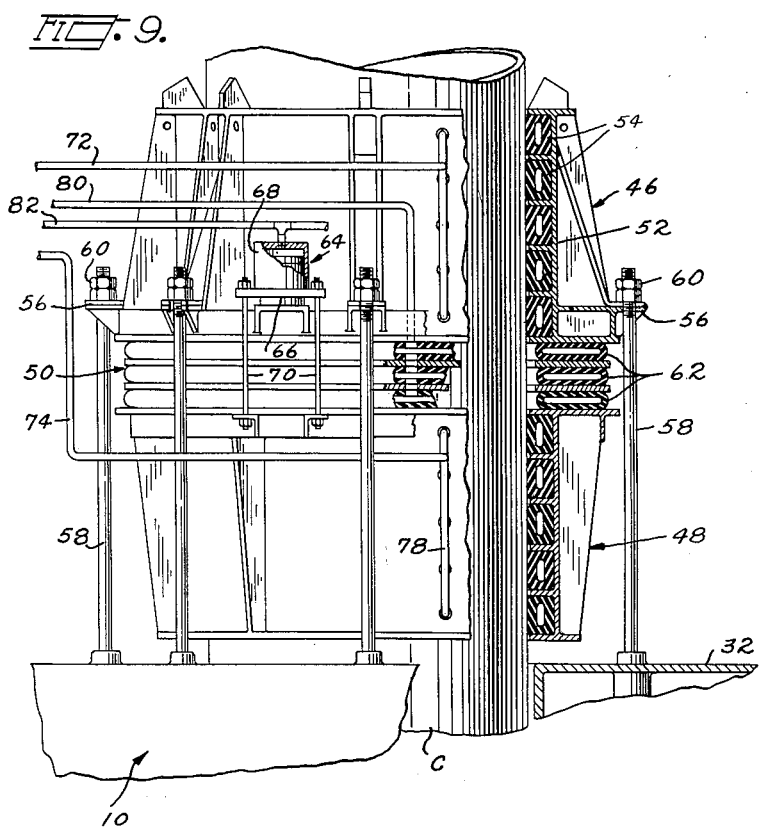

United States Patent Office 2,976,693
Patented Mar. 28, 1961

2,976,693

METHOD OF OPERATING MARINE STRUCTURES

Robert N. Showalter, Mukilteo, and Leon B. De Long, Seattle, Wash., and George E. Suderow, Staten Island, N.Y., assignors to De Long Corporation, New York, N.Y., a corporation of Delaware Filed Oct. 11, 1954, Ser. No. 461,454

11 Claims. (Cl. 61—46.5)

This invention relates to apparatus for drilling wells in offshore locations at relative deep-water depths, and more particularly to methods of operating drilling barges of the type shown in the copending applications of Robert W. Pointer, Serial No. 143,627, filed February 11, 1950, and now abandoned, and Serial No. 283,567, filed April 22, 1952, now Patent No. 2,775,869. The invention will be disclosed with reference to specific marine-bottom conditions existing in certain areas of the Gulf of Mexico, but it will be realized that such conditions also exist elsewhere and that certain of the novel methods disclosed herein are applicable to other conditions as well.

In the aforementioned applications, there is disclosed a barge having a buoyant hull equipped with a plurality of vertically-extending supporting elements, there disclosed as caissons, which are guided for vertical movement relative to the hull in corresponding guiding openings or wells in the latter. Jacks are mounted on the hull and are releasably engageable with each caisson to forcefully effect relative vertical movement between the caisson and the hull. By means of this structure, the hull can be floated to any selected marine location and the caissons moved down to engage with the marine bottom while the hull is still floating. Thereafter, by operation of the jacks the hull can be raised out of the water on the caissons to an elevation well above the crests of the waves, to thus provide a stable platform from which drilling operations or the like can be conducted. After a drilling operation has been completed, the hull can be lowered by the jacks back down into the water until the hull is again afloat. Thereupon, by operating the jacks the caissons can be pulled up and the barge floated to another drilling site.

The marine bottom in certain areas of the Gulf of Mexico, as well as in other locations, is composed for the most part of a deep layer of alluvial mud, that is, a mixture of silt and water, overlying harder understrata. In its upper portions, the mud layer may contain as much as 80% water, while its deeper parts have smaller water content. Tides run quite strong in the Gulf, and strong winds, sometimes of hurricane force, are not infrequent at certain seasons of the year. Because of these conditions, offshore drilling in the Gulf, and in other locations having similar conditions, presents numerous problems, not only of cost, but also of safety.

The above-mentioned caisson-supported barge, however, when operated in accordance with this invention overcomes numerous of the difficulties attendant with offshore drilling in the Gulf. This application discloses methods of manipulating and operating such apparatus, and the inventive objects and advantages of such methods will be evident from the following description and accompanying drawings, in which:

Figures 3 to 7 illustrate the successive steps employed for manipulating the barge into drilling position.

Figure 8 is a bow end view of the barge shown in Figure 7, but showing such barge equipped with a drilling rig and illustrating the method of centering the drilling derrick with the rotary table.

Figure 9 is an enlarged fragmentary elevational view, partly in vertical section, illustrating a jacking mechanism suitable for use with the barge shown in Figure 1.

Figure 1:
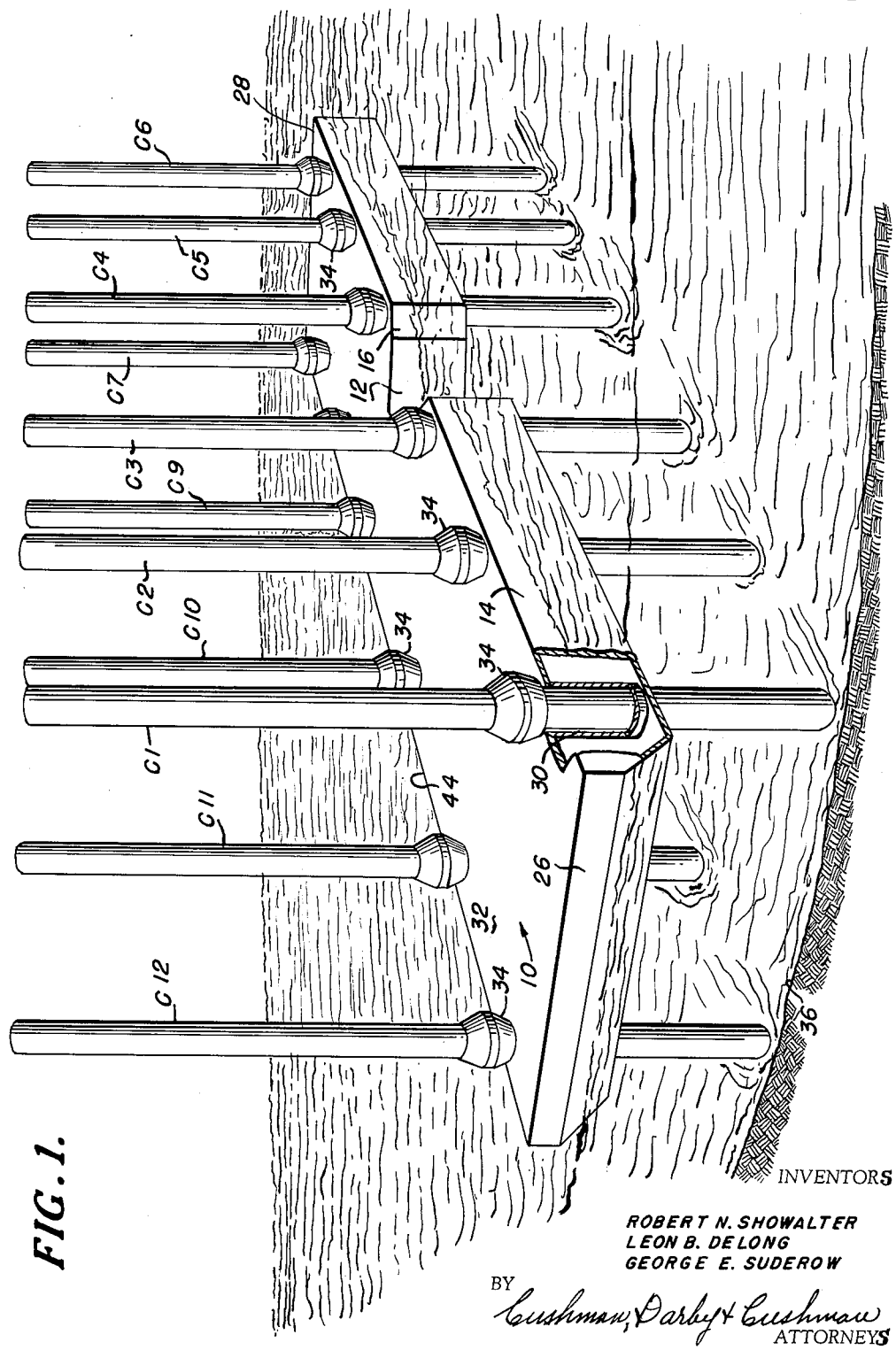
Figure 1 is a perspective view of a floating barge employed for practicing this invention.

Referring now to the drawings, there is shown a drilling barge equipped with apparatus for practicing this invention. The specific barge illustrated comprises a generally-rectangular buoyant hull 10, which in an actual operating embodiment has a length of the order of 200 feet and a beam of the order of 80 feet. It will be obvious, however, that many of the herein disclosed methods of operation are adaptable to barges of other configurations. Preferably, the hull 10 is compartmented (not shown) for the storage of liquid ballast and supplies, e.g., fuel oil, potable water, salt water, drilling mud, etc. Normally, provisions are made for pumping liquid ballast from one compartment to another or for merely admitting sea water selectively to ballast compartments to trim the craft. Somewhat aft of the midpoint of its length in the specific embodiment shown, the hull 10 is provided with a lateral drilling slot 12 having vertically-extending side and end walls. Also, in the embodiment shown, the drilling slot 12 opens to the port side 14 of the hull 10 and preferably the side walls of the slot diverge somewhat outwardly adjacent their outer ends, as at 16.

For well drilling operations, as shown in Figure 8, the barge is equipped with a rotary drilling table 18 positioned over the slot 12, a conventional derrick 20 having tackle 22 for supporting a string of drill pipe (not shown) in alignment with the rotary table, draw works 24 for use with the derrick, and other necessary drilling equipment (not shown). In actual practice, by loading or design, the barge may float bow-high; i.e., there may be more freeboard at the bow 26 than at the stern 28. Also, because of loading arrangements or rough weather ballasting arrangements, the barge may list to one side or the other.

Spaced along each side of the hull 10 and preferably arranged generally symmetrically with respect to the longitudinal center line thereof are a plurality of vertically-extending hollow circular steel caissons C that are somewhat loosely slidably guided for relative vertical linear movement in corresponding caisson wells 30 (Figure 1) that extend vertically through the hull 10 and have aligned circular top and bottom guiding openings. These guiding wells 30 are of slightly greater diameter than the caissons C mounted therein so as to somewhat loosely receive and linearly guide the latter, as mentioned above and as disclosed in detail in the aforementioned applications. In actual practice, such caissons C are of the order of six feet in diameter uniformly throughout their entire lengths, while the wells 30 are about six feet and one inch in diameter. The caissons C are hollow, but preferably are closed (not shown) adjacent their bottom ends for increased marine-bottom-bearing area. In an actual operating embodiment of a barge embodying this invention, such caissons C are 184 feet in length. Twelve such caissons C1 to C12, as shown in the drawings, have been found adequate for a barge of the above-mentioned size, such caissons being arranged in opposite pairs, C1 and C12, C2 and C11, etc., spaced along the length of the barge at locations determined by the load distribution on or in the hull 10 to generally evenly distribute the weight of the barge among all the caissons when the hull is raised out of the water thereon, as later described. Preferably, two caissons are located closely adjacent and on opposite sides of the mouth of the slot 12, such as the caissons C3 and C4. It will be realized, however, that the number and spacing of the caissons can be varied to accommodate barges of various sizes and operating conditions. In barges of other configurations, it also will be realized that other caisson locational patterns may be employed and determined primarily by load distribution.

Secured to the deck 32 of the barge at each caisson well 30 and in surrounding relation to the corresponding caisson C is a jack 34, which preferably is of the type described in detail in the aforementioned copending application Serial No. 283,567. As shown in Figure 9, a jack of that type includes upper and lower caisson-surrounding gripper assemblies 46 and 48 and an interposed lifting assembly 50. Each gripper assembly 46 and 48 comprises a steel ring 52 provided on its interior with a plurality of inwardly facing circumferential channels within each of which is disposed a rubber-like tubular inflatable annular gripping element 54. On inflation each element 54 will tightly grip the caisson C and on deflation release such grip. The lower end of the lower gripper assembly 48 is adapted to engage the barge deck 32 under certain operating conditions, while the upper assembly 46 is provided with circumferentially arranged bifurcated radial ears 56 adapted to loosely straddle and slide on upstanding tension bolts or rods 58 anchored at their lower ends to the barge 10. Nuts 60 on the upper ends of the rods 58 serve as abutments engageable by the ears 56 to limit upward movement of the upper gripper assembly 46 relative to the barge 10.

The lifting assembly 50 comprises a plurality of annular inflatable rubber-like tubes 62 separated by flat retainer plates. Inflation of the tubes 62 serves to urge the gripper assemblies 46 and 48 apart and the latter may be drawn together by one or more retractor assemblies 64. Each retractor assembly 64 includes an upwardly extending piston 66 on the upper gripper assembly 46, a cylinder 68 on the piston 66 having a closed upper end, and tension rods 70 connecting the cylinder to the lower gripper assembly 48.

The supply and exhaust of pressure fluid to and from the upper and lower gripper assemblies 46 and 48 is conducted through appropriate pipes 72 and 74 and manifolds 76 and 78. Similarly, pipes 80 and 82 are connected to the lifting assembly 50 and the retractor assembly 64 to provide for the supply and exhaust of fluid pressure thereto and therefrom. Preferably, the pipes 72, 74, 80 and 82 are connected to a suitable source of pressure fluid (not shown) through appropriate control valves (not shown) which permit the selective operation of each jack individually or all jacks in unison by master control valves (not shown) as described more in detail in the aforementioned Pointer patent.

Appropriate operation of the controls enables each jack to produce step-by-step vertical linear relative movement between each caisson C and the hull. When the jacks 34 are released, the caissons C are free to rotate and also to move linearly in their respective wells 30. It is also pointed out that the jacks 34 are so mounted on the barge that they are capable of limited movement in any direction transversely of their corresponding caisson wells 30 and also can cant slightly relative to the axis of such wells, which wells, as described heretofore, are of slightly larger diameter than the caissons C. Hence, while the caissons C are guided for axial slidable movement in the caisson wells 30, they can cant slightly in such wells. It is also pointed out that the jacks are detachably mounted on the barge and can readily and easily be removed therefrom by unfastening securing nuts. Similarly, replacement can be effected with equal facility.

It is also pointed out that other types of jacks which operate on somewhat the same general principles can be employed. Such other types of jacks are shown, for example, in the copending applications of Joseph E. Lucas, Serial No. 348,269, filed April 13, 1953, and George E. Suderow, Serial No. 378,103, filed September 2, 1953. It also will be realized that for operation in relatively great water depth, e.g., one hundred feet and more, it probably would be desirable to use open-work tower structures (not shown) instead of tubular caissons. Even though such structures probably would be rectangular in cross section, jacks operating on the general principles of the above-mentioned types could readily be adapted for use with such tower structures.

In operation of the barge, the caissons C are installed in the wells 30 and are held in upright position therein by the jacks 34. The barge then may be towed to a predetermined drilling site by one or two tubs (not shown) lashed to opposite sides of the barge at its bow end 26 or by a single tug using a towing bridle (not shown) in conventional fashion. In actual practice, a barge similar to that illustrated in the drawings has been operating at drilling sites wherein the water is about 45 feet deep. Buoyant barges of this character normally are constructed and loaded so that they will float slightly bow-high; i.e., there will be more freeboard at the bow 26 than at the stern 28 when the barge is floating unrestrainedly. Hence, when the barge is under tow, the freeboard at the stern and at the bow will be substantially the same. Moreover, because of loading or rough weather ballasting, the barge may have a port or a starboard list. A bow-high and port-list condition are shown in Figure 1.

If rough weather is encountered during a tow, the jacks 34 may be operated to lower the caissons deeper into the water, thus lowering the overall center of gravity of the barge and lessening the danger of capsizing the barge by wind or wave action. Moreover, because the caissons C are closed near their bottom ends and thus tend to and may even become buoyant as they ride deeper and deeper in the water, such caisson buoyancy tendencies enhance the overall stability of the barge. In the event that a tow is for a long distance and the weather is relatively calm, the barge preferably is towed with the caissons C in their up position (not shown), i.e., with none or only a short section of the caissons projecting downwardly below the hull 10 of the barge, in order to reduce towing resistance.

Figure 2:
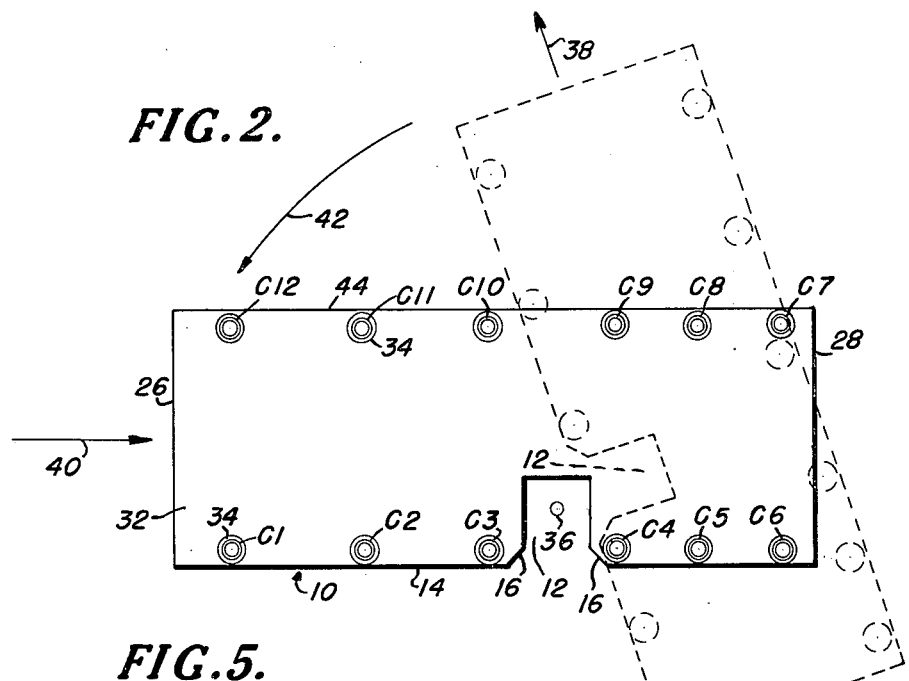
Figure 2 is a plan view of the barge shown in Figure 1 illustrating the method of locating the barge at a drilling site.

A predetermined drilling site, usually chosen by known geological surveying methods, is normally marked with a buoy 36, as shown in Figure 2, and it is highly desirable to position the barge so that the drilling site will be located directly beneath and in vertical alignment with the rotary table 18. To effect such precise positioning of the barge, the following procedure is preferred. The barge is towed to the site at an angle to the prevailing wind direction, as shown in dotted lines in Figure 2 wherein the arrows 38 and 40 indicate the towing and prevailing wind directions, respectively, so that the windward side, in this case the port side 14, of the barge slowly passes closely by the buoy 36. When the barge reaches a position where the buoy 36 is located opposite the mouth of the slot 12, as shown in dotted lines in Figure 2, the towing tug or tugs stop and the jack 34 supporting caisson C4 is released, thus freeing such caisson to drop without restraint, save as guided by its well 30, to the marine bottom 36 and to penetrate into the mud a considerable distance, as shown in Figure 3. In actual practice, it has been found that a caisson C dropped to the bottom of the Gulf of Mexico in this manner will, because of its own weight, penetrate the mud from about 5 to about 15 feet, depending on the elevation of the caisson relative to the hull 10 when the caisson is dropped. This penetration has been found to be sufficient to pin the barge in place while leaving the same free to swing or pivot about the single dropped caisson C4. Thereupon, either by maneuvering by a towing tug or the appropriate employment of a streamed anchor and a winch (not shown) on the barge, the latter is pivoted about the caisson C4, as indicated by the arrow 42 in Figure 3, until the bow 26 of the barge faces the prevailing wind direction 40. By such pivotal movement, the slot 12 encloses the buoy 36 without interference therewith, while the rotary drilling table 18 is moved directly over and in substantially vertical alignment with the drilling site marked by the buoy. Thus, the barge is precisely located on the site and oriented in the most desirable position, i.e., bow into the wind, as shown in solid lines in Figure 2.

When the barge has been so located, one or two additional caissons C are dropped to anchor the barge against further pivotal movement. The choice of the next one or two caissons to be dropped depends upon the fact that it is highly desirable for the barge to be level before all the remaining caissons are dropped or, as guided by their wells 30, they will fall at an appreciable angle to the vertical and thus probably cause a binding condition in their wells when the barge is raised out of the water, as later described. Accordingly, the barge is then anchored against pivotal movement by dropping one or two additional caissons C on the low side (or bow or stern) and the barge is levelled by operating the jacks 34 of these dropped caissons to force them downwardly into the mud until the reaction force on the hull 10 lifts its low side or corner sufficiently to level the barge. Thus, for example, assuming the barge to float bow-high and to have a port list, as shown in Figures 1 and 3, after it has been located and oriented on the site as described above, the jack 34 supporting caisson C6 is released, thus dropping the caisson C6 into the mud. The jacks for caissons C4 and C6 are then operated individually to forcefully drive these caissons downwardly into the mud until the reaction force on the hull 10 raises its port side 14 sufficiently to eliminate the port list. At this time, caisson C7 is dropped into the mud by releasing its jack 34, and the jacks 34 for caissons C6 and C7 located at the stern 28 of the barge are operated individually to drive them into the mud until the reaction force on the hull 10 lifts its stern 28 sufficiently to eliminate the aforementioned bow-high free-floating condition. It thus will be seen that the barge will be level, as shown in Figure 4.

It should be noted here that the water at drilling locations in the Gulf normally is fairly calm, so that the barge does not rock or pitch appreciably. Nevertheless, wave action sometimes is encountered which causes considerable rocking or pitching. Even in this event, however, the above locating and leveling procedure may be carried out without damaging the caissons C4, C6, and C7, their jacks 34, or the hull mountings for the latter, because of the soft mud bottom.

As stated heretofore, the caissons C are free to cant slightly in their wells and the jacks 34 are mounted on the hull 10 for limited yielding movement in any direction transversely of their respective wells 30, in order to accommodate such canting without binding the caissons against longitudinal movement. It also is pointed out that the caissons C4, C6, and C7 do not penetrate very deep into the mud during the leveling operation, because these caissons take only enough of the weight of the barge to level the same.

Because of the permissible relative angular movement between the hull 10 and the caissons C4, C6, and C7, even when the latter are engaged by their jacks 34, and the relative shallow penetration of these caissons, the leveling operation straightens the caissons C4, C6, and C7 in the mud after having been dropped at an appreciable angle thereto because of the initial bow-high and port-list condition of the barge.

Figure 5:
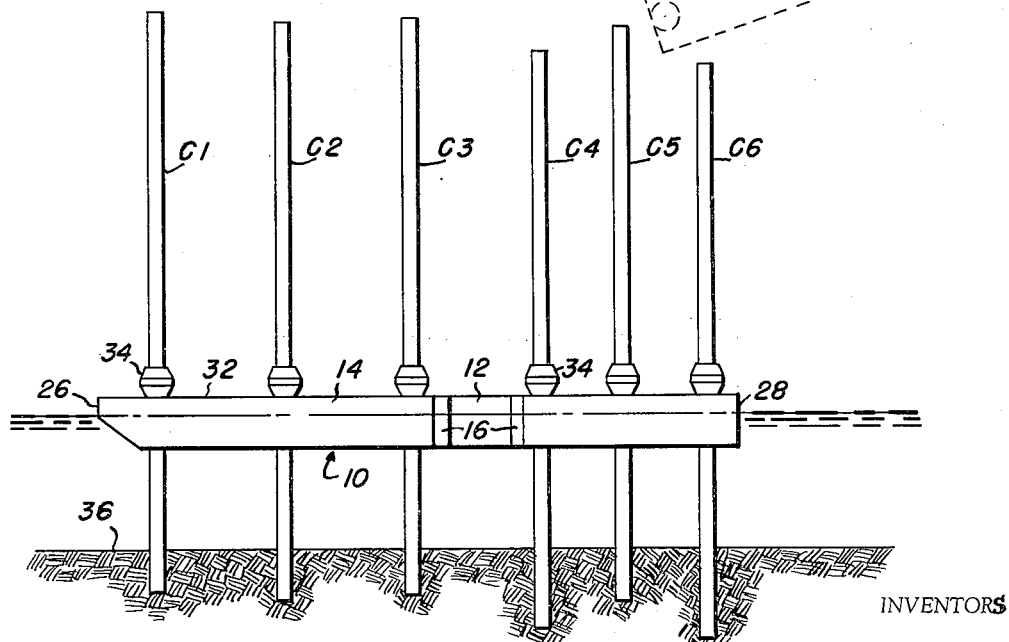

After the leveling operation, all the remaining caissons C1 to C3, C5, and C8 to C12 are dropped simultaneously by the master jack control and fall substantially vertical except for the slight deviation therefrom permitted by the loose guiding of the caisson wells 30. Hence, all of the caissons C are then positioned substantially perpendicular to the barge and to the horizontal, as shown in Figure 5. In this connection, if a sea is running, the remaining caissons C1 to C3, C5, and C8 to C12 are dropped at a time when the barge is relatively level and, after being released by their jacks 34, these caissons take only a few seconds to fall to the bottom 36 and penetrate into the mud from five to fifteen feet.

The next step is to assure that all of the caissons C have a firm footing in the bottom 36 so that, when the hull 10 is elevated on the caissons to drilling position far above the water, as later described, no settling of any of the caissons will later occur with resultant tilting of the hull 10 or other sinking movement thereof below drilling elevation. Because of the previously-described character of the marine bottom in certain areas of the Gulf of Mexico, even though a caisson may support a given load for an appreciable period of time without sinking farther into the mud, later settlement does and will occur. To avoid such condition, each caisson C must be driven into the mud bottom 36 by a load or force considerably greater than that supported by the caisson when the hull 10 is in elevated drilling position. Desirably, this preloading or predriving procedure is as follows.

Figure 6:
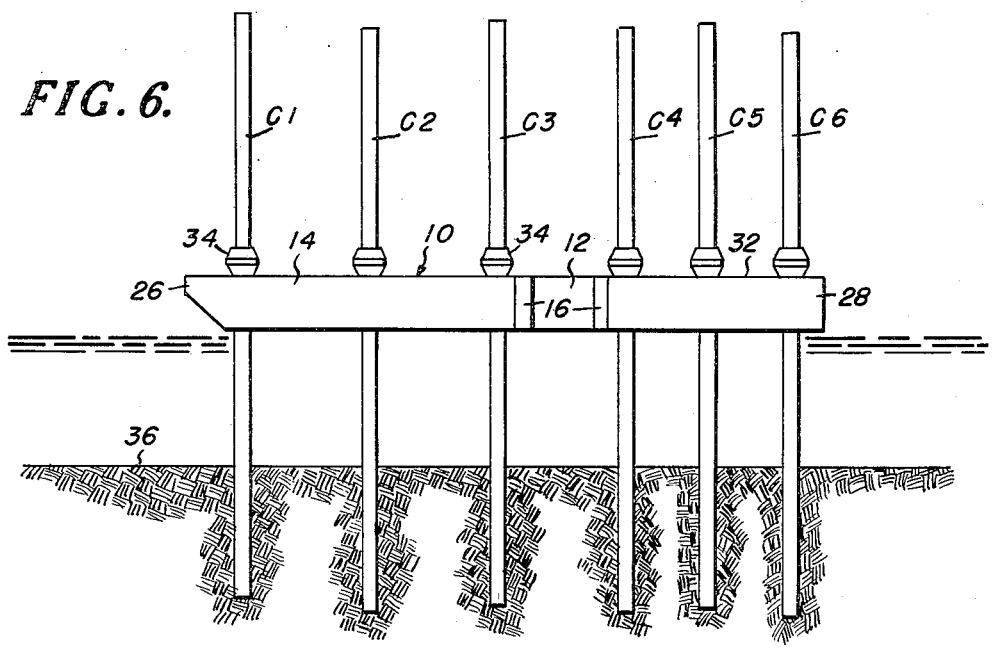

After all the caissons C have been dropped as described above, all of the jacks 34 immediately are operated simultaneously by their master control to raise the hull 10 on the caissons, and this relative movement is continued until the entire or a major portion of the weight of the hull is supported on all of the caissons; i.e., the hull is raised slightly out of the water, as shown in Figure 6, or nearly out of the water. It will be realized that the caissons C will penetrate bottom portions of varying degrees of softness and, consequently, as more and more of the weight of the hull 10 is imposed thereon, will sink or be driven downwardly at varying distances into the mud bottom 36 during this hull-raising operation. Nevertheless, because all of the jacks 34 are supplied with air pressure from a common source and can be operated in unison by a master control, as disclosed in the aforementioned application Serial No. 283,567, the hull 10 can be raised evenly by the jacks 34 by proper manipulation of the jack controls and will maintain a substantially level position during such raising operation, even though the several caissons C are driven downwardly into the mud bottom 36 at varying distances during such hull-lifting operation.

Such jack operation is accomplished by observing the separating movements between the upper and lower jack rings or gripper assemblies 46 and 48 during each simultaneous lifting stroke of the jacks. At those locations where the mud is softer and the caissons sink farther into the mud, jack-ring separation is relatively rapid, i.e., jack operation is fast, while at the harder mud locations wherein the caissons do not sink and the jacks actually tend to raise the hull 10 rather than drive the caissons, jack-ring separation is quite slow or non-existent. Since the bellows or tubes 62 of all the jacks are supplied with pressure fluid from a common source, e.g., a manifold (not shown), so that they are under equal pressure, and since the admission of pressure fluid thereto is relatively slow, as long as one or more caissons C are moving or being driven down into the mud fairly rapidly, the bellows pressure in all the jacks will be less than source pressure and insufficient to raise the hull appreciably by those jacks operating on the harder-bottomed caissons. Once all the jacks 34 have reached the ends of their strokes, however, full source pressure will build up rapidly in all the jack bellows, so that full lifting or hull-raising force is applied by the jacks operating on the harder-bottomed caissons, and this force will lift the hull 10 and possibly cause tilting thereof. By shutting off the pressure supply to all the jack bellows, however, before full stroke of the rapidly-operating jacks is accomplished, full hull-raising force is not applied by the jacks to the harder-bottomed caissons and the hull 10 will remain level during each step of the operating cycle of the jacks. Of course, once all the caissons C are driven sufficiently to take their proportionate share of the total load without sinking deeper into the mud, full-stroke operation of the jacks 34 can be had and the hull 10 will raise uniformly on all the caissons C.

After the hull has been raised on the caissons C until the latter support substantially the entire weight of the hull 10, the jacks 34 are operated individually and in succession to drive each caisson C separately into the mud until it reaches a point of refusal; i.e., further operation of its jack starts to raise the hull 10 rather than to move the caissons downwardly into the mud. During this predriving operation, it will be seen that, theoretically at least, each caisson is driven downwardly with a force about at least as large as the weight of the hull 10, and supplies and equipment thereof and therein, divided by the number of caissons, in this instance one-twelfth of the weight of the hull. By individually pre-driving the caissons to refusal with the hull so raised, a much greater predriving load can be applied to each caisson than that possible when the hull is afloat. As stated above, the theoretical predriving load (without lifting the hull) is at least equal to one-twelfth the weight of the hull, but actually is even greater, because all the other mud-embedded caissons resist pull-out so that a predriving load greater than one-twelfth hull weight can be exerted without raising the hull.

Even after predriving the caissons with the hull 10 so raised, it still is possible for caisson settlement to occur in the mud-bottom conditions heretofore described. Such settlement may even result from one or more caissons breaking through a harder crust strata after prolonged bearing thereon. Even if such a breakthrough or a settlement sufficient to lower the hull 10 appreciably does occur, however, no harm will be done, because the flat undersurface of the hull 10 is at or slightly below water level and any such drop or fall will merely result in a cushioned sinking of the hull back into the water with not even a jar.

After each caissons C has been individually predriven to refusal, it has been found necessary in actual practice, because of the aforedescribed mud-bottom conditions, to even further assure that no settlement of any caisson will occur while the hull 10 is supported in elevated drilling position. Hence, it is desirable to apply a driving force or load on each caisson greater than the aforementioned one-twelfth of the hull weight to drive them even deeper into the mud, if a somewhat greater driving force will effect such action. This action is accomplished by generally symmetrically supporting the weight of the hull 10, and its equipment and supplies, on less than all of the caissons. In an actual operating embodiment of a barge having twelve caissons, this greater driving force can be accomplished by supporting the hull weight on six out of a total of twelve caissons, thus imposing a driving load on the six supporting caissons theoretically equal to one-sixth of the hull weight and double the load necessary to be carried by these caissons when the hull is in drilling position. Of course, the supporting caissons should be selected for substantially uniform load distribution thereon and with due regard for the resulting increased cantilever stresses imposed on the barge hull 10.

Thus, for example, in the barge embodiment illustrated in the drawings, the hull weight can be supported entirely on caissons C2, C4, C6, C7, C9, and C11 by operating the jacks for caissons C1, C3, C5, C8, C10, and C12 to relieve the load of the hull thereon. Preferably, the load on these latter caissons is gradually relieved by starting with the lower grippers of the load-relieving jacks engaged with their caissons and their bellows inflated to full stroke. Thereupon, pressure in the bellows is slowly bled off, to thus slowly relieve the caissons C1, C3, C5, C8, C10, and C12 of the hull weight. Hence, if any undue settlement of any or all of the caissons C2, C4, C6, C7, C9, and C11 should occur, the bleeding off of bellows pressure can be stopped immediately to cease further load-relieving. If, while the six caissons C2, C4, C6, C7, C9, and C11 support the entire weight of the hull 10, the latter should tilt slightly, because one or more of the six supporting caissons settles slightly farther into the mud, the jacks on all of the caissons C are thereafter operated to re-level the hull. After this operation of loading caissons C2, C4, C6, C7, C9, and C11 with about one-sixth of the weight of the hull for each, the other six caissons are similarly loaded by engaging their jacks and operating the jacks for caissons C2, C4, C6, C7, C9, and C11 to relieve the load thereon. Thereafter, and if any tilting has occurred by such loading of the caissons C1, C3, C5, C8, C10, and C12, the hull is releveled by appropriate operation of all the jacks 34.

In this connection, it will be seen that, even though all the caissons C are substantially perpendicular to the marine bottom 36, because of the cantable and laterally-yieldable mounting of the jacks 34 on the hull 10 and because of the permissible slight cant of the caissons C in their wells 30, it is possible for the hull 10 to tilt somewhat relative to the caissons C without a jamming lock of the caissons in the jacks against vertical movement relative to the hull. In fact, because of the aforedescribed mounting of the caissons in the wells and of the jacks on the hull, the hull can tilt about one foot, or maybe even two feet, in any direction without jamming of the caissons against linear movement in their wells.

Figure 7:
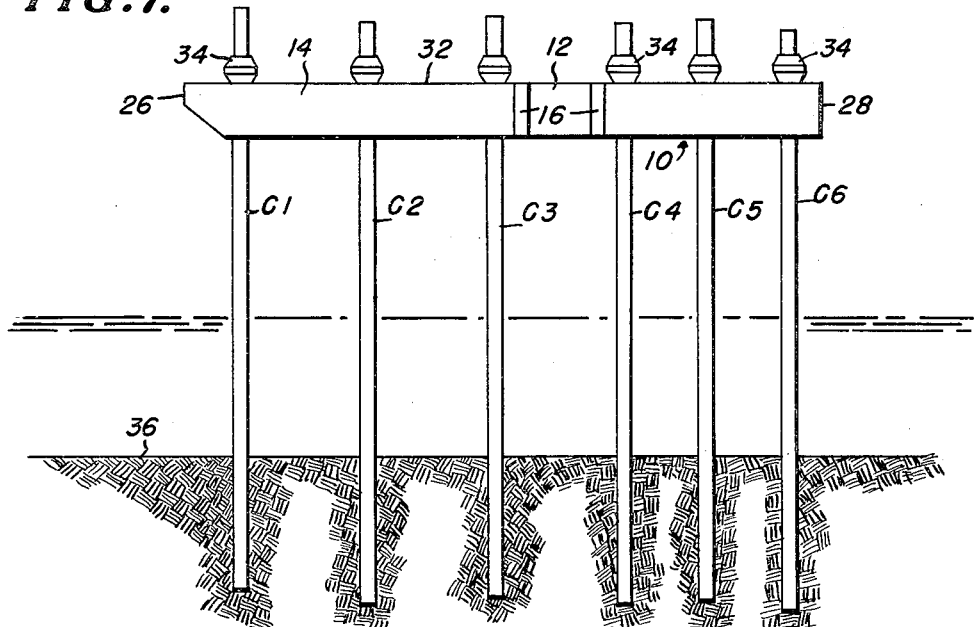

After all the caissons C have been predriven downwardly into the mud to a firm footing, as described above, all of the jacks 34 are operated simultaneously to raise the hull 10 well above the crest of wave action. In normal operation, the bottom of the hull 10 usually is raised to about forty feet above water level, as shown in Figures 7 and 8. During this raising operation, the hull 10 will be maintained substantially level by the simultaneous operation of all the jacks 34 from their master control. In connection with the operation of raising the hull far above water, it is pointed out that, even though the caissons C are not all exactly parallel and actually cant at slight angles in various directions, because of the aforedescribed permissible yielding movements of the jacks 34 relative to the hull 10 no jamming lock of the caissons in the jacks can occur during the raising operation. Furthermore, even though driven deeply into the mud bottom 36 to depths of the order of forty feet or more, the caissons C move slightly toward the vertical as the hull 10 is raised because of the camming or wedging action of the caisson wells 30 on the caissons.

In some instances, it will be found that, when the hull 10 is in drilling position and is exactly level, the derrick 20 for the drill string is not exactly centered with respect to the rotary table 18, so that the tackle 22 suspended from the derrick will not be plumb with the center of the rotary table. This result may obtain because of incorrect mounting of the derrick 20, various misalignments of structural parts, etc. In this event, it is substantially impossible to drill with the rotary table 18 because the upper end of a length of pipe (not shown) suspended from the tackle 22 will not be centered over the rotary table. With a barge embodying this invention, it is a substantially simple matter to plumb the derrick tackle 22 with the rotary table 18 by selectively operating the jacks 34 to tilt the hull 10 in the appropriate direction until the tackle is plumb or centered with a rotary table. Thus, for example, if the derrick 20 is centered slightly to starboard relative to the center of the rotary table 18, i.e., a straight line extension of the tackle 22 intercepts the rotary table at a point on the starboard side of its center, as shown in solid lines in Figure 8, the jacks 34 along the starboard side 44 can be operated to lift the starboard side of the hull 10 slightly and tilt the latter to port until the tackle is plumb with the center of the rotary table, as shown in dotted lines in Figure 8.

After the hull 10 has been so elevated and its level adjusted, if necessary, to center the derrick tackle 22 with the rotary table 18, mechanical gripping elements (not shown), similar to those disclosed in the aforementioned applications or in the copending application of George E. Suderow, Serial No. 382,948, filed September 29, 1953, are engaged with the caissons C to support the entire weight of the hull 10, and its equipment, by such gripping elements and thus enable the jacks 34 to be released and the compressed air supply (not shown) therefor turned off. The hull 10 will remain elevated in this position until after the well to be drilled has been completed, cased, and capped. Of course, the derrick 20 may be adjusted, as described above, as may be required at any time during drilling or other operations carried out in building an oil well.

In some instances, a fleet of such barges may be operated to develop an oil field. By means of this invention, it is possible to use a single set of jacks for the entire fleet, thus saving the tremendous expense of a set of jacks for each individual barge in the fleet. When it is realized that the cost of each jack is of the order of twenty thousand dollars and upward, the resultant tremendous savings are readily appreciated. As previously stated, the jacks 34 are detachable. Hence, when one barge is in elevated position and held in such position on its caissons by mechanical gripping devices while a well is being drilled therefrom, its jacks can be removed, transported to another barge, and attached thereto to raise the latter barge to drilling position on its caissons or lower it back into the water from such position, as later described, after completing a well therefrom. When the well has been completed by the first-mentioned barge, the jacks can be brought back to lower it into the water for a move to another location. Thus, a single set of jacks can be used to operate an entire fleet of barges.

In connection with the mechanical grippers, it is pointed out that they also permit limited relative transverse and canting movements between the individual caissons C and the hull 10 as limited by the canting lock of the caissons in their wells 30. Hence, the entire hull 10 may sway slightly, probably no more than one to two inches, in any direction. Moreover, the tubular caissons C can bend slightly under large forces, i.e., high winds acting on the barge. In this respect, the caissons C are somewhat resilient; that is, they will become somewhat oval in cross section under large bending forces and return to circular cross section when the bending forces are relieved. Thus, the movable mounting of the mechanical grippers on the hull 10, together with the resiliency of the caissons C, provides a somewhat cushioned support for the hull which enables the aforedescribed swaying movements thereof. This permissible swaying movement, as contrasted to an absolutely rigid hull-supporting structure, contributes greatly to the effectiveness of the hull 10, jack 34, and caisson C arrangement as a mobile drilling platform which is amply stable for drilling operations, regardless of wind and wave action. In fact, since the caissons C penetrate deeply into the mud, the barge cannot be shifted from the site, even by winds of hurricane force, while the barge hull 10 is removed far above wave action by its elevated position.

In driving caissons into a marine bottom 36 of the character aforedescribed, the problem of pulling up the caissons, when desired, has always been of paramount importance. Once a caisson has been driven deeply into the mud (in an actual operating embodiment of the barge disclosed herein caissons have been driven to mud-penetration depths of the order of seventy feet) and remains in the mud for an extended period of time, e.g., a week or more, the mud settles and packs around the caissons and exerts a gripping action thereon that can be overcome only by an excessive pulling force. In a barge of the type disclosed herein, however, the swaying movements of the elevated hull 10 by wind action thereon, together with wave action on the caissons C, continually slightly sway the latter in the mud. Such swaying movement of the caissons C prevents the mud from packing therearound sufficiently tightly to hold the caissons against reasonable pulling forces. Hence, in a barge of the instant type, the caissons normally can be pulled by the jacks 34 without difficulty.

When a caisson penetrates the mud to great depths, however, the lower end thereof is held substantially rigid in the mud, even though the upper end thereof may sway slightly, and the aforedescribed mud-packing and gripping action may occur. In such instances, the caisson is pulled up slightly, such as an inch or two, from time to time, e.g., every day or so, by its jack and then driven back down to its original position by its jack. Such an operation has been found to prevent the mud from packing so tightly about a caisson that it becomes substantially impossible to pull the caisson out of the mud.

After the well to be drilled has been completed and capped and it is desired to move the barge to another drilling location, all of the jacks 34 are operated to grip the caissons C, whereupon the mechanical gripping elements can be released. Thereupon, the jacks 34 are operated simultaneously by their master control to slowly lower the hull 10, while maintaining it level, until it enters the water and becomes buoyant. The next step is to pull the caissons C out of the mud so that the barge can be floated to another location. During the operation of moving the barge off a completed well, it is imperative that the barge be maneuvered without bumping the well pipe (not shown) to avoid possibly disastrous damage thereto, e.g., break-off of the pipe.

Hence, after the hull 10 becomes buoyant the jacks 34 are maintained in engagement with their caissons C and the latter are pulled out of the mud in a preferred sequence which utilizes the footing or bearing of certain of the caissons to prevent the pulling reaction force on the hull from possibly unduly tilting the latter. Thus, by individual operation of their jacks, the caissons C2, C5, C8, and C11 are pulled up about twenty feet, one at a time, and held in such position by their jacks. During this operation, it will be seen that the remaining eight caissons still provide a footing for the barge. Next, the caissons C1, C4, C9, and C12 are pulled up, one at a time, until their lower ends still remain about ten feet in the mud. During this operation, it will be seen that the four caissons C3, C5, C8, and C10 still provide a footing for the barge and that the four caissons C2, C6, C7, and C11 also assist in counteracting the caisson-pulling reaction force on the hull 10 because these latter four caissons are still considerably deep in the mud. Thereupon, the caissons C3, C5, C8, and C10 are pulled up about twenty feet, one at a time, while the four caissons C2, C6, C7, and C11 still provide some pulling-reaction footing for the hull. Next, the eight caissons C2, C3, C5, C6, C7, C8, C10, and C11 are pulled up individually until their lower ends are at the same mud-penetration depth as the four caissons C1, C4, C9, and C12, i.e., about only ten feet in the mud, in which position all the caissons are being held by their jacks. Thereupon, all of the jacks are operated by master control to pull up all of the caissons simultaneously except caissons C2 and C4. This jacking will continue until all of the caissons, save C2 and C4, have been pulled up slightly more than ten feet, so that their lower ends clear the mud and are about one foot off bottom and held in such position by their jacks. At this time, it will be seen that both caissons C2 and C4 still penetrate the mud about ten feet, and thus serve to continue to anchor the barge in place.

In connection with pulling the caissons C out of the mud, it is desirable to make sure that each caisson can be pulled by its jack 34 before the foregoing squence of operations is carried out. Thus, each caisson is initially tested in turn by pulling it slightly by its jack. In the event that any particular caisson is stuck so tightly in the mud that the pulling force capable of being exerted thereon by its jack is insufficient to loosen it, it can be gripped by its jack and the jacks for all the other caissons operated to raise the hull 10, thus exerting the combined pulling force of the other eleven jacks on the stuck caisson. In carrying out any such operation, due regard, of course, should be given to the resulting stresses imposed on the hull to avoid any damage to the latter.

After the above-described caisson-pulling procedure and while the caissons C2 and C4 are still about ten feet in the mud and held in such, a tug is connected to the barge or an anchor streamed from a winch thereon so that the barge will be under control when the caissons C2 and C4 are pulled out of the mud. After a tug or anchor has been so connected to the barge, caisson C2 is pulled up by its jack until its bottom just clears the mud. Thereupon, it will be seen that the barge can be pivoted around caisson C4, by its actually turning in the mud, by the tug or winch to the dotted-line position shown in Figure 2 so that the drilling slot 12 will swing clear of the well pipe, which will be at the location previously marked by the buoy 36. It also will be seen that the prevailing wind direction aids in this pivoting movement once the same has been initiated by the tub or winch. After the barge has thus pivoted sufficiently for the capped well to clear the outer end of the drilling slot 12, the caisson C4 is pulled up until its bottom end is clear of the mud and the barge can be towed to another drilling site.

In connection with the aforementioned pivoting of the barge, it has been found in actual practice that the ten-foot mud penetration of the caisson C4 is sufficient to pin the barge against linear movement or shifting sufficient to bump the well pipe, while at the same time permitting the caisson to rotate in the mud while engaged and held up by its jack against sinking back in the mud. On the other hand, during the initial pivoting operation to locate the barge on the site, the caisson C4 is gripped so tightly by the mud, after having been initially dropped therein, that it usually will not turn or rotate in the mud without damaging its jack. Hence, the jack 34 for the caisson C4 usually must be released to permit the barge to pivot or turn relative to the caisson C4 for the locating operation.

In some instances, it may be desirable to accomplish the initial locating operation by lowering the "pivot" caisson down into the mud by its jack instead of dropping it. In this case, the depth of penetration of the "pivot" caisson can be controlled so that it will turn in the mud while gripped by its jack without damage to the latter. Even when using tower-type hull-supporting members, as previously described, instead of circular caissons, the depth of penetration of a supporting member can be controlled by its jack so that, even though such member is noncircular in cross section, it can actually turn in the marine bottom when engaged by its jack without damage to the latter.

In some types of drilling barges, the drilling slot extends longitudinally inwardly from the stern (not shown) instead of laterally inwardly from the side. In that case, somewhat different procedures may be employed for locating the barge on a drilling site and moving the barge from a completed well. In locating the barge at a drilling site, the barge can be backed onto the site from the prevailing wind direction, by operation of a tug, until the drilling slot encloses the marking buoy, thus obviating the pivoting step, previously described. The remaining preliminary steps of leveling the barge and predriving the caissons are carried out, however, as heretofore described. In still other instances, the pivoting operations may be desirable for locating a barge on and moving it off a drilling site, even though the drilling slot is in the stern instead of a side of the barge.

In refloating such a barge wherein the pivoting procedure is not practiced and in moving it from a completed well, all of the previously-described caisson-pulling procedures are followed up to the point where all the caissons still remain about ten feet in the mud. At that time, a tug or tugs are connected to the barge preparatory to towing it forwardly away from the well. Thereupon, all the jacks are operated simultaneously to pull up all the caissons at the same rate until their lower ends are free of the mud. The tugs then immediately start the tow.

It is again pointed out that, if the barge is to be moved only a short distance to another drilling site, the caissons are left in the position wherein their bottom ends are within a short distance of the marine bottom, to save the time necessary for raising the caissons all the way up. In this same connection, it is highly desirable to prevent canting movements of the caissons C in their wells 30 while the barge is being floated from one location to another. Such wobbling movements can be avoided and the caissons held substantially rigid by engaging both the upper and lower gripping elements of the jacks 34 and inflating the bellows of the latter for forcing the gripping elements against their respective abutments. Thus, the caissons can cant only by compressing the bellows.

It thus will be seen that the objects of the invention have been fully and effectively accomplished. It will be realized, however, that the specific embodiment shown and described for the purpose of illustrating the principles of the invention is subject to change without departure from such principles. Therefore, this invention includes all modifications encompassed within the spirit and scope of the following claims.

We claim:

1. The method of erecting a platform at a soft-bottom marine location of predetermined water depth, the steps comprising: floating to the location a barge having a buoyant hull, a plurality of upstanding elongated hull-supporting members mounted generally symmetrically on the hull and guided for substantially vertical relative linear movement therebetween, the length of each of the members being greater than the water depth at the location plus the height of the hull and all the members being held up off the marine bottom while the barge is floated to the location; moving the members down into engagement with the marine bottom; raising the hull on the members until substantially the entire weight of the hull is supported thereon, i.e., the bottom of the hull is substantially at water level; releasing the support of certain of said members so that substantially the entire weight of the hull is supported stably and generally symmetrically on less than all of the members in order to load each of the members which are then supporting the hull with a weight greater than its proportional share of the total hull weight when all of the members are supporting the hull; re-engaging the support of the hull on said certain members; repeating the releasing and re-engaging operation with other members until each of the members has been so loaded; and raising the hull on the members to an elevation above wave action.

2. The method of erecting a platform at a soft-bottom marine location of predetermined water depth, the steps comprising: floating to the location a barge having a buoyant hull, a plurality of upstanding elongated hull-supporting members mounted generally symmetrically on the hull and guided for substantially vertical relative linear movement therebetween, the length of each of the members being greater than the water depth at the location plus the height of the hull and all the members being held up off the marine bottom while the barge is floated to the location; moving the members down into engagement with the marine bottom; raising the hull on the members until substantially the entire weight of the hull is supported thereon; i.e., the bottom of the hull is substantially at water level; individually and sequentially driving each of said members to refusal into the marine bottom by exerting opposing forces between each member and the hull while fixing the hull to the remaining members against said relative movement; releasing the support of certain of said members so that substantially the entire weight of the hull is supported stably and generally symmetrically on less than all of the members in order to load each of the members which are then supporting the hull with a weight greater than its proportional share of the total hull weight when all of the members are supporting the hull; re-engaging the support of the hull on said certain members; repeating the releasing and re-engaging operation with other members until each of the members has been so loaded; and raising the hull on the members to an elevation above wave action.

3. The method of moving a drilling barge having a buoyant hull from a completed marine well having an upstanding pipe aligned vertically within a drilling slot extending inwardly from one edge of the hull, the barge including an upstanding elongated member mounted on the hull adjacent the mouth of the drilling slot and guided for substantially vertical linear movement relative to the hull, the length of the member being greater than the water depth at the well site plus the height of the hull, and starting with the hull afloat and the member penetrating the marine bottom to a depth sufficient to substantially pin the barge thereto and with means in addition to the member engaged with the marine bottom and anchoring the barge against rotational movements, the steps comprising: disengaging the anchoring means from the marine bottom; pivoting the barge away from the well pipe about the axis of the member until the outer end of the slot is clear of the well pipe; pulling the member up until its bottom end clears the marine bottom and holding the member in such position relative to the hull; and moving the barge away from the well.

4. The method of moving a drilling barge having a buoyant hull from a completed marine well having an upstanding pipe aligned vertically within a lateral drilling slot extending inwardly from one side of the hull, the barge including an upstanding elongated member mounted on the hull adjacent the mouth of the drilling slot and guided for substantially vertical linear movement relative to the hull, the length of the member being greater than the water depth at the well site plus the height of the hull, and starting with the hull afloat and the member penetrating the marine bottom to a depth sufficient to substantially pin the barge thereto and with means in addition to the member engaged with the marine bottom and anchoring the barge against rotational movements; the steps comprising: disengaging the anchoring means from the marine bottom; pivoting the barge away from the well pipe about the axis of the member until the outer end of the slot is clear of the well pipe; pulling the member up until its bottom end clears the marine bottom and holding the member in such position relative to the hull; and moving the barge longitudinally away from the well.

5. The method defined in claim 4 in which the member initially penetrates the marine bottom to an extent which substantially precludes rotation thereof about its axis and including the steps before the pivoting step of pulling the member up until it will rotate about its axis relative to the marine bottom while still serving to pin the barge and of substantially fixing the member to the hull for rotation therewith during the pivoting step.

6. The method of moving a drilling barge having a buoyant hull from a completed marine well having an upstanding pipe aligned vertically with a lateral drilling slot extending inwardly from one side of the hull, the barge including a plurality of upstanding elongated hull- supporting members mounted generally symmetrically on the hull and guided for substantially vertical relative linear movement therebetween, one of the members being located adjacent the mouth of the slot and the length of each of the members being greater than the water depth at the well site plus the height of the barge, starting with the members engaged with and penetrating the marine bottom at various depths and the hull supported on the members in elevated position above wave action, the steps comprising: lowering the hull on the members until the hull is afloat; individually pulling up each of said members in sequence until their bottom ends are on the same level and still penetrate the marine bottom sufficiently to hold the barge in position at the well site and holding each member in its pulled-up position; simultaneously pulling up all the members, except the one adjacent the mouth of the slot and one other, until their bottom ends clear the marine bottom and holding the pulled-up members in their bottom clearing positions; pulling the said other member up until its bottom end clears the marine bottom and holding it in such position; pivoting the barge away from the well pipe about the axis of the member located adjacent the slot mouth until the outer end of the slot is clear of the well pipe; pulling the last-mentioned member up until its bottom end clears the marine bottom and holding it in such position; and moving the barge longitudinally away from the well.

7. The method of moving a drilling barge having a buoyant hull from a completed marine well having an upstanding pipe aligned vertically within a drilling slot extending inwardly into the hull, the barge including a plurality of upstanding elongated hull-supporting members mounted generally symmetrically on the hull and guided for substantially vertical relative linear movement therebetween, the length of each of the members being greater than the water depth at the well site plus the height of the barge, starting with the members engaged with and penetrating the marine bottom at various depths and the hull supported on the members in elevated position above wave action, the steps comprising: lowering the hull on the members until the hull is afloat; individually pulling up each of said members in sequence until their bottom ends are on the same level and still penetrate the marine bottom sufficiently to hold the barge in position at the well site and holding each member in its pulled-up position; simultaneously pulling up all the members at the same rate until their bottom ends clear the marine bottom at the same time and holding the members in such position; and moving the barge away from the well pipe.

8. The method of refloating at a marine location of predetermined water depth a barge having a buoyant hull, a plurality of upstanding elongated hull-supporting members mounted generally symmetrically on the hull and guided for substantially vertical relative linear movement therebetween, the length of each of the members being greater than the water depth at the location plus the height of the hull, and pressure-operated jack means mounted on the hull for each of said members and releasably engageable therewith for effecting said movement, starting with the members engaged with and penetrating the marine bottom at various depths and the hull supported on the members in elevated position out of the water, the steps comprising: engaging the jack means of one of the members to hold the one member against said relative movement; operating the jack means of more than one of the remaining members in a direction to raise the hull thereon and thus loosen the grip of the marine bottom on the said one member; lowering the hull by simultaneous operation of all the jack means until the hull is afloat; and pulling up all the members by their jack means until their bottom ends clear the marine bottom.

9. The method of erecting a marine platform at a location of predetermined water depth wherein the marine bottom is soft, the steps comprising: floating to the location a barge having a buoyant hull, a plurality of upstanding hull-supporting elongated members mounted generally symmetrically on the hull and guided for substantially vertical relative linear movement therebetween, the length of the members being greater than the water depth at the location plus the height of the hull, and pressure-operated step-by-step jack means mounted on the hull for each member for effecting said movement, the members being held up by their jack means off the marine bottom during movement of the barge to the location; moving the members down into engagement with a marine bottom of varying degrees of softness whereby the members will have different rates of penetration for the same driving force; operating all the jack means simultaneously from a common pressure source to effect said relative step-by-step movement in a direction to drive the members into the marine bottom and to raise the hull thereon while stopping each movement-effecting cycle of all the jack means before the end of their full stroke to maintain the hull level as the members sink into the marine bottom at various rates of penetration; and after all the members have penetrated into the marine bottom to a depth sufficient to support their proportionate share of the weight of the hull, continuing to operate all of the jack means simultaneously at full stroke on each movement-effecting cycle thereof to raise the hull above water.

10. The method of preventing freezing against pull-out of elongated members having the lower ends thereof penetrating into a marine bottom and an above-water platform supported thereon, the steps comprising: periodically pulling each member a slight distance upwardly by exerting opposing forces between the platform and the member while stably supporting the platform on the remaining members, and redriving the member substantially back to its original depth of penetration into the marine bottom by exerting opposing forces between the platform and the member in the reverse direction.

11. The method of refloating at a marine location of predetermined water depth a barge having a buoyant hull, a plurality of upstanding elongated hull-supporting members mounted generally symmetrically on the hull and guided for substantially vertical relative linear movement therebetween, the length of each of the members being greater than the water depth at the location plus the height of the hull, starting with the members engaged with and penetrating the marine bottom at various depths and the hull supported on the members in elevated position out of the water, the steps comprising: individually slightly pulling up each of the members in sequence to loosen the grip of the marine bottom thereon while the remaining members are fixed against upward movement relative to the hull; lowering the hull on the members until the hull is afloat; and pulling up all the members until their bottom ends clear the marine bottom.

References Cited in the file of this patent

UNITED STATES PATENTS

| | | |
|---|---|---|
| 978,266 | Smith | Mar. 21, 1911 |
| 1,731,236 | Dow | Oct. 15, 1929 |
| 1,792,065 | Bowers | Feb. 10, 1931 |
| 2,210,408 | Henry | Aug. 6, 1940 |
| 2,657,540 | Templeton | Nov. 3, 1953 |
| 2,775,869 | Pointer | Jan. 1, 1957 |
| 2,833,118 | Nixon | May 6, 1958 |
| 2,892,435 | Ljungstrom | June 30, 1959 |

FOREIGN PATENTS

| | | |
|---|---|---|
| 612,201 | Great Britain | Nov. 9, 1948 |

OTHER REFERENCES

Engineering News Record, May 29, 1952, pp. 44–45.